(12) United States Patent
Doerr et al.

(10) Patent No.: US 6,408,111 B1
(45) Date of Patent: Jun. 18, 2002

(54) PHASE SHIFTERS WITH REDUCED THERMAL CROSSTALK

(75) Inventors: Christopher Richard Doerr, Middletown; Lawrence Warren Stulz, Neptune, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/542,426

(22) Filed: Apr. 4, 2000

(51) Int. Cl.[7] .............................................. G02F 1/035
(52) U.S. Cl. .............................. 385/3; 385/14; 385/132
(58) Field of Search ................................. 385/132, 3–9, 385/42, 48, 14

(56) References Cited

U.S. PATENT DOCUMENTS 6,163,633 A * 12/2000 Ueda
6,246,809 B1 * 6/2001 Jouanno et al.

* cited by examiner

Primary Examiner—Hung N. Ngo

(57) ABSTRACT

A planar lightguide circuit (PLC) phase shifter is fabricated on a chip which exhibits reduced thermal crosstalk by reducing the thermal resistance between the waveguide cores and the thermal "ground" (e.g., a heat sink) compared to the thermal resistance between the waveguide cores. This is accomplished by removing some of the glass from the backside of the chip over a small area under the phase shifters, depositing metal on the backside, and soldering it to a copper block heat sink.

8 Claims, 1 Drawing Sheet

PHASE SHIFTERS WITH REDUCED THERMAL CROSSTALK

RELATED APPLICATIONS

This invention is related to co-pending application Ser. No. 09/520,828, filed Mar. 6, 2000, entitled "Polarization Independent Dynamic Equalizer".

FIELD OF THE INVENTION

This invention relates to dynamic optical wavelength power equalizers and, more particularly, to reducing thermal crosstalk.

BACKGROUND OF THE PRIOR ART

It is known that changing the temperature of a planar lightguide circuit (PLC) can affect the index of refraction so that when the PLC is used, for example, as a Mach-Zehnder Interferometer (MZI), the change in refractive index can be used to adjust the phase delay. Likewise, changing the index of refraction can be used to vary the coupling ratio of a directional coupler used in Fourier filters and ring filters. To vary refractive index, a heater can be deposited on the surface of the PLC. Generally, a substantial temperature change is required to effect the desired adjustment.

In the above mentioned copending Cappuzzo 7 application, the speed of response to a temperature change is increased by forming the heater strip on the upper cladding of a dual clad planar waveguide and by providing a heat channel between the heater and the waveguide core so as to reduce the thermal inertia. To minimize losses and achieve a PLC having small size, the spacings between components is made as small as possible. Unfortunately, small size tends to produce significant mutual coupling and thermal crosstalk. It would be advantageous to be able to retain small size and close component spacing without introducing crosstalk.

SUMMARY OF THE INVENTION

In accordance with the principles of our invention, in one aspect thereof, an illustrative PLC phase shifter is fabricated on a chip which exhibits reduced thermal crosstalk by reducing the thermal resistance between the waveguide cores and the thermal "ground" (e.g., a heat sink) compared to the thermal resistance between the waveguide cores. This is accomplished by removing some of the glass from the backside of the chip over a small area under the phase shifters, depositing metal on the backside, and soldering it to a copper block heat sink.

BRIEF DESCRIPTION OF THE DRAWING

The foregoing and other features of the invention may become more apparent from a reading of the ensuing description, together with the drawing, in which.

GENERAL DESCRIPTION

Figure 1:
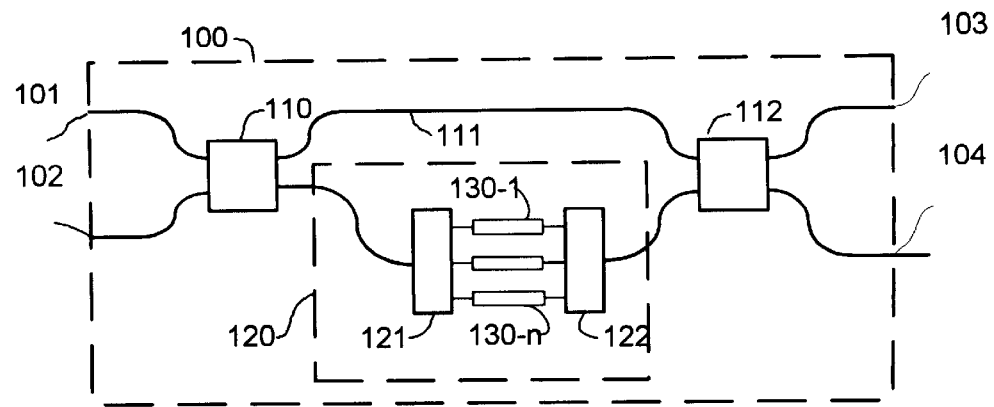
FIG. 1 shows an illustrative Mach-Zehnder equalizer with the phase shifters fabricated on a PLC chip-.

FIG. 1 shows a Mach-Zehnder interferometer 100 which receives incoming light from fiber 101 or 102. The incoming light is applied to a coupler 110 which splits the light power into two paths, the upper path including a waveguide 111 and a lower path including grating-lens-grating array 120. Array 120 is advantageously fabricated as a planar lightguide chip (PLC) having a ρn/n of 0.65%, and a grating arm number of 30. Coupler 110 is an evanescent coupler for illustrative purposes (it could be another type of optical coupler, such as a multimode interference coupler or a star coupler). Grating 121 separates (demultiplexes) the lightwave from coupler 110 into its constituent bands (channels) so that an array of phase shifters 130-1 through 130-n (hereinafter array 130 et seq) may apply specified phase shifts to each channel present in the lightwave. Advantageously, array 130 et seq may employ thermooptic phase shifters. Phase shifter array 130 et seq applies corresponding respective phase shifts to the respective channels. The channels of phase-shifted light exiting array 130 et seq are remultiplexed in grating 112 and applied to coupler 112 which reassembles them together with the lightwave from waveguide 111 and applies the assembled light wave to fiber 103.

Figure 2:
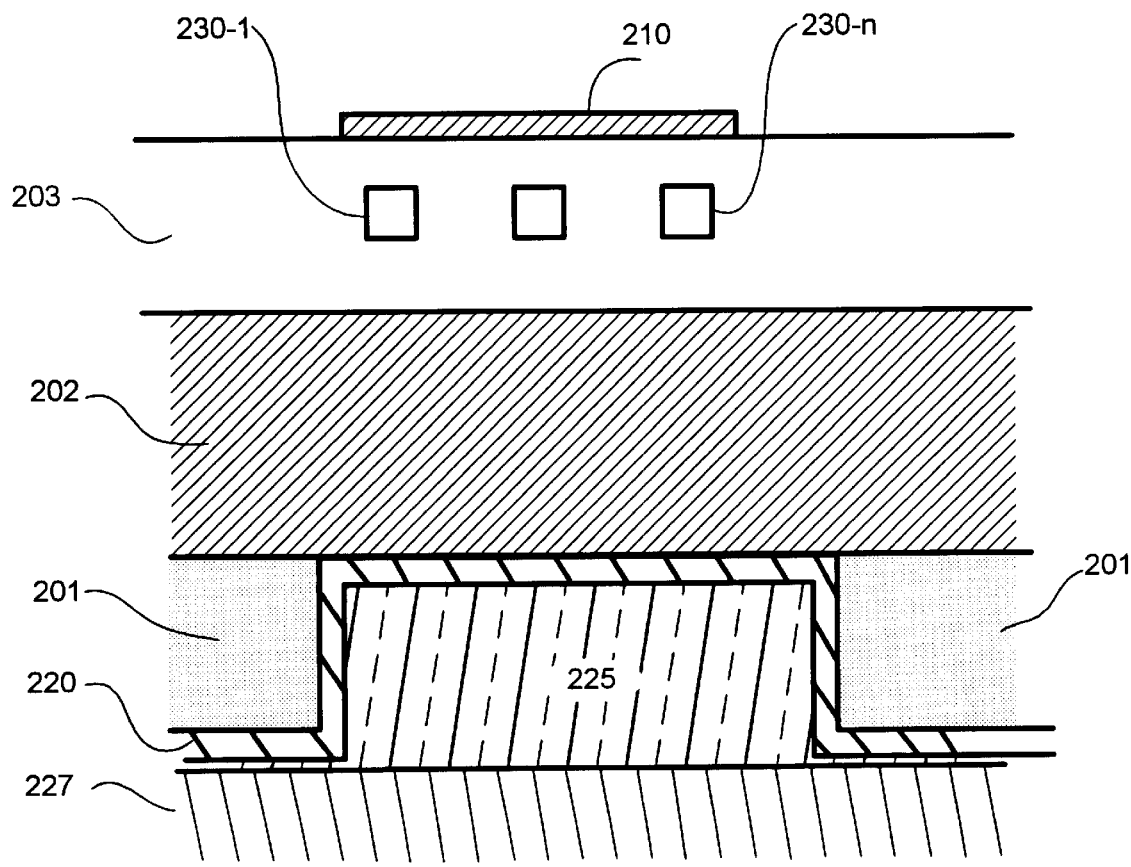
FIG. 2 shows the detailed construction of the PLC fabricated to reduce thermal cross talk according to the invention.

An illustrative embodiment of a PLC according to the invention is shown in FIG. 2, (not drawn to scale). At 230-1 through 230-n are shown a plurality of phase shifters or waveguide cores corresponding to phase shifter array 130 et seq. of FIG. 1. Illustratively, cores 230 et seq. are 5–7 $\mu$m on a side and are contained within a glass cladding layer 203 having an overall illustrative depth of about 30 $\mu$m. A comparatively thick silicon layer 202 (illustratively, 600 $\mu$m) separates the cladded core layer from backside glass layer 201. The silicon used in layer 202 is preferably of the type used in the so-called optical bench technology for high quality optical integrated circuits. Substrate 202 may be silicon or other suitable material to provide rigid support.

A heater strip 210 of electro-resistive material such as chrome or nickel chrome is located on the surface of the upper cladding layer overlying the region of cladded cores 230 et seq. Electrodes, not shown, are typically gold or copper contact pads attached at the ends of strip 210, and connected to a power source. The heater strip is typically formed using a simple additive technique such as mask evaporation. Heater strip 210 and the cores 230 et seq are to be carefully aligned to facilitate appropriate uniform heating of the cores as severe misalignment can result in temperature gradients in the waveguide cores which cause serious degradation in performance. The heating strip 210 is advantageously aligned over the waveguide core by blanket depositing the electro-resistive material and defining the heater strip using photolithography. The heater strip is then used as a mask to etch the upper cladding layer to form heat channel 24 through cladding layer 203 to cores 230 et seq.

In accordance with the invention, a portion of backside glass 201 has been removed in the region underneath cladded cores 230 et seq. adjacent to heat sink 227. The removed glass has been replaced by a deposited metal coating 220 and solder 225 which bond the PLC to heat sink 227.

The manufacture of the PLC advantageously may employ many of the techniques used in optical fiber technology that are well known and widely used. With reference to FIG. 2, layer 203, which will form the glass cladding for cores 230 et seq is advantageously grown on a silicon wafer 202 by high pressure oxidation. At the same time, backside glass layer 201 is grown, balancing out the strain on the wafer due to differing thermal expansion coefficients.

The layer for cores 230 et seq is deposited over the glass layer 203 by chemical vapor deposition (CVD) of doped $SiO_2$ using established CVD techniques. Typical CVD deposition processes use precursors of silane or halogenated silane and hydrogen, with hydrides or halides of phosphorus or germanium for the doping material. The level of doping is such as to create an index difference between cores 230 et seq and cladding 203 of 0.3–1.5%. The core layer is then etched, using a mask to produce the waveguide core. Typically, in a conventional process, the heater strip 210 is formed by evaporating or sputtering a layer of the resistive material and is patterning the layer by a standard lift-off process. In the preferred embodiment of the invention the heater strip is formed by photolithography to achieve precise alignment between the heater strip 210 and the core array 230 et seq. Heat from the heater strip locally changes the refractive index of the cladding layer 203 and thus changes the optical containment of core array 230 et seq.

The width $W_1$ of heater strip 210 should be substantially greater than the width $W_2$ of core array 230. For effective waveguide function, $W_1$ should exceed $W_2$ by at least 6 □m, but for effective heat channeling should not exceed $W_2$ by more than 20 □m. Preferably $W_1$ is in the range 1.5 to 7 $W_2$. The thermal resistance in the glass layer 203 and in the silicon layer 202 is proportional to the distance the heat has to travel in each material, multiplied by the coefficient of thermal resistance of the respective material. In an illustrative embodiment where waveguide cores 230-1, 230-n are spaced 100 $\mu$m apart and where layers 203 and 201 are each about 30 $\mu$m and layer 202 is about 600 $\mu$m, the thermal resistance between the waveguide cores would be about 10 times that of the resistance from a waveguide core to thermal ground if the backside glass 201 were not removed. When the backside glass is removed under the waveguide cores, the thermal resistance between the waveguide cores is about 100 times that of the resistance from a waveguide core to thermal ground. This greater comparative resistance reduces crosstalk between waveguide cores.

The foregoing is illustrative of the principles of the invention in which a portion of the glass is removed from the backside of the chip under the phase shifters, metal-, is deposited on the backside and soldered to a copper block. In this manner, the thermal resistance between the waveguide cores and ground is dramatically decreased thereby reducing thermal crosstalk by a couple of orders of magnitude. Note that removing all the backside glass also works, but it will likely cause the chip to bow, complicating dicing and packaging. Further and other modifications will be apparent to those skilled in the art and may be made without, however, departing from the spirit and scope of the invention.

What is claimed is:

1. A planar lightguide chip having reduced thermal crosstalk between waveguide cores comprising: layers of substrate, waveguide cores and cladding surrounding the cores; a heating element for locally altering the refractive index of the cores relative to the cladding, and a heat sink, CHARACTERIZED IN THAT a portion of said substrate between said waveguide cores and said heat sink includes a metal layer, said metal layer being soldered to said heat sink.

2. A planar lightguide chip according to claim 1 wherein said chip layers comprise a central layer of silicon and outer layers of glass, said waveguide cores being situated in the layer of glass closest to said heating element.

3. A planar lightguide chip according to claim 1 wherein said waveguide cores form a Mach-Zehnder interferometer having a waveguide in one arm and a cascaded grating-lens-grating filter in the other.

4. A planar lightguide chip according to claim 1 wherein said lightwave circuit is fabricated in one of said glass layers.

5. A planar lightguide chip according to claim 4 wherein said heating element overlies said waveguide cores.

6. A planar lightguide chip according to claim 2 wherein said portion of said replaced substrate is in the layer of glass remote from said heating element underlying said waveguide cores.

7. A planar lightguide chip according to claim 6 wherein the ratio of, the thermal resistance between said waveguide cores and said heat sink is lower than the thermal resistance between adjacent ones of said cores by a substantial factor.

8. A planar lightguide chip according to claim 6 wherein the the thermal resistance between the waveguide cores is about 100 times that of the resistance from a waveguide core to said heatsink.

* * * * *